United States Patent Office 3,426,091
Patented Feb. 4, 1969

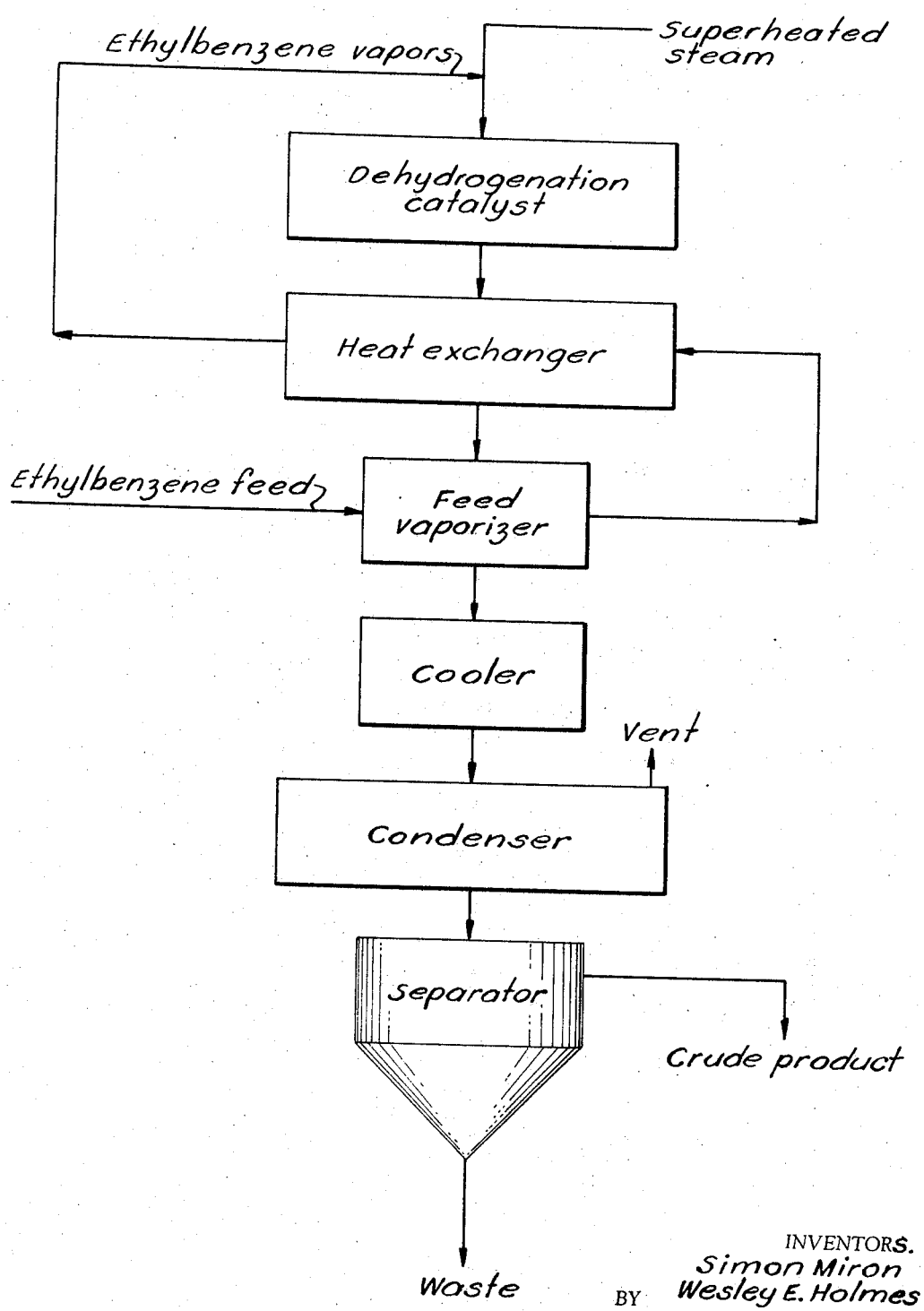

3,426,091
REMOVAL OF POLYMER FROM PROCESS VESSELS
Simon Miron, Lake Jackson, and Wesley E. Holmes, Angleton, Tex., assignors to The Dow Chemical Company, Midland, Mich., a corporation of Delaware
Filed May 2, 1967, Ser. No. 635,425
U.S. Cl. 260—669
Int. Cl. C07b 3/00; C07c 5/18
2 Claims

ABSTRACT OF THE DISCLOSURE

The method concerns the removal of polymeric deposits which build up in process vessels used in the manufacture of styrene by (a) contacting the polymer with a mixture of hot air and steam and (b) dissolving the residue resulting from (a) in crude styrene or any solvent suitable for dissolving polystyrene.

---

This invention pertains to the removal or the cleaning out of polymer from process vessels in which it has formed. Particularly, it relates to the removal or the cleaning out of polymeric deposits in process vessels for the manufacture of monomers, e.g., styrene, wherein the hot vapor products resulting from the catalytic dehydrogenation of ethylbenzene are condensed.

It is known to manufacture styrene by dehydrogenating ethylbenzene in a series of steps which comprises (1) feeding ethylbenzene vapors and superheated steam concurrently and continuously to a reaction vessel containing a dehydrogenation catalyst at elevated temperatures to produce at least a portion of dehydrogenated or cracked ethylbenzene vapor, i.e., styrene vapor, (2) passing the resulting mixture of product vapors through a heat exchanger, some of the heat of the product mixture being used in said heat exchanger to heat vapors of the ethylbenzene feed stream, (3) passing the product vapor mixture through a second heat exchanger to vaporize the liquid ethylbenzene feed, (4) passing the product mixture from the dehydrogenation zone through a cooler to further lower the temperature of said vapor mixture, (5) passing the cooled product vapor mixture to a condenser or heat exchanger to condense liquid product and (6) passing the condensate to a separator wherein the organic layer is separated from the aqueous layer and a crude liquid product containing styrene and ethylbenzene is obtained from which the styrene is recovered in usual ways, e.g., by distillation. In such process, after a period of operation, polymeric deposits build up in the condenser with resultant partial plugging thereof and correspondingly a decrease in efficiency of the condensing unit as well as an increase in the reactor inlet pressure. Continued build up of the polymeric deposits results in inefficient and undesirable operating conditions. Periodically, therefore, the dehydrogenation or cracking process is shut down to remove or clean the polymer from the condenser. The polymeric deposits appear to be crosslinked since they are difficultly soluble in many of the commonly known solvents for polystyrene.

The polymer can be removed from the plugged or partially plugged-up tubes of the condenser by (1) mechanical means, then retubing of the condenser, or by (2) discarding the plugged-up tubes and retubing the condenser with new tubes, or (3) by decomposing and/or degrading the polymer deposits with an inert gas or superheated steam heated to 300–350° C. or thereabout.

The heretofore proposed methods are unsatisfactory for the reasons that the first method is expensive as well as time-consuming, the second expensive, and the third mainly damaging to the process equipment itself.

It has now been discovered that polymeric deposits can be removed with minimum expense, time and damage to process equipment from the condensers used in the process for dehydrogenating ethylbenzene to styrene by contacting, after shutting down the process, the polymer in the condenser with a mixture of hot air and steam in order to decompose and/or degrade or solubilize the polymer, and, removing the degraded polymeric residue by contacting it with crude styrene or any solvent suitable for dissolving polystyrene, or alternatively, after the process is back in operation, removing the degraded polymeric residue by contacting it with hot dehydrogenation product mixture whereby the degraded polymer residue dissolves and is washed away, leaving the condenser substantially free of any polymeric deposits. Substantially all of the polymer which is not decomposed is degraded so that it is solubilized and dissolves in the hot, crude styrene product.

The accompanying drawing is a diagrammatic flow sheet of a process for the manufacture of styrene by the catalytic dehydrogenating or cracking of ethylbenzene in admixture with superheated steam to form styrene in a continuous manner. The drawing is self-explanatory.

To remove or clean the polymeric deposits from the condensers in accordance with the method of the invention, the polymer deposited therein is contacted with a stream of a hot air-steam mixture containing from about 1 to 50, and preferably from about 10 to 30, cubic feet of air per pound of steam. The mixture contains steam as a diluent to inhibit or prevent uncontrolled combustion or burning from occurring in the condenser.

The hot air-steam mixture can be contacted with the polymer deposits in the condensers at a temperature of from about 180° to 270° C., and preferably from about 200–260° C., to decompose and/or degrade the polymer. If the temperature used is too low, the amount of decomposition/degradation will be very small and the polymeric deposits will remain substantially insoluble. If the temperature used is too high, the process equipment can be damaged by over-heating. A suitable amount of steam can be used to maintain the operative temperature limits within the range stated above and according to the invention.

The hot air-steam mixture can be contacted with the polymeric deposits in the condenser for a period of from about 8 to 24 hours or more, preferably from about 12 to 20 hours, and at atmospheric pressure or thereabout.

The quantity of the hot air-steam mixture as well as the length of time required to clean the condensers will depend mainly in part upon the interval between cleanings and in part upon the amount of polymeric build-up.

The effect most desired by contacting the polymer with a stream of hot air-steam is the degradation or solubilizing effect. Secondarily, decomposition or weight loss is desired. After passing the stream of hot air-steam over the polymer, the dehydrogenation process can be started up again. The hot, crude styrene condensing in the condenser will dissolve and wash away the degraded polymer leaving a clean condenser. Alternatively, crude styrene or any solvent suitable for dissolving polystyrene such as benzene, toluene, xylene, or ethylbenzene can be passed through the condenser after contacting the polymer with the hot air-steam mixture and prior to start-up in order to dissolve and wash away the degraded polymer. In addition to increased operating efficiency, a substantial reactor inlet pressure drop accompanies the polymer removal in the condensers, e.g., a drop in pressure on the order of about 20 to 50 percent of that prior to removal of the polymer.

The method of this invention is useful for removing or solubilizing polymeric deposits which build up within any process vessel used in the manufacture of styrene such as the condenser, cooler, etc.

The following non-limiting examples serve to illustrate the invention.

Example 1

In an ethylbenzene dehydrogenation process similar to that shown in the accompanying drawing, there was evidence of polymer build-up in the condensers after continuous operation for a period of twelve months. The cracking unit contained two condensers in parallel, each condenser containing a bundle of 420 tubes of one inch outside diameter and 12 gauge metal. Initially, the pressure on the inlet to the reactor was 11.5 pounds per square inch gauge (p.s.i.g.), and, prior to shutting it down for removing or cleaning out the polymer therefrom the pressure on the inlet to the reactor was 14.5 p.s.i.g.

The system was shut down for cleaning. Into the condensers was fed a stream of hot air-steam at a temperature of 250° C. for a period of 16 hours. The hot air-steam mixture contained about 20 cubic feet of air per pound of steam, and the steam was fed at the rate of about 5000 pounds per hour. After contacting the polymer build-up in the condensers with the current of hot air-steam thereby decomposing and degrading a substantial portion of the polymer, the dehydrogenation process was again started up. The hot, crude styrene formed in the condenser dissolved the degraded polymer residue and washed it from the condenser. As a result of the polymer removal the pressure on the inlet to the reactor dropped to 11.5 p.s.i.g.

Example 2

An ethylbenzene dehydrogenation process similar to that described in Example 1 and shown in the accompanying drawing was shut down for cleaning following a procedure similar to that described in Example 1, except that the cracking unit contained one condenser, the initial pressure on the inlet to the reactor was 12 p.s.i.g., and prior to shutting it down for removing or cleaning out the polymer therefrom the pressure on the inlet to the reactor was 20 p.s.i.g. In addition, prior to shutting down the cracking unit for cleaning in accordance with the invention, the production of crude styrene was about 1200 pounds per hour.

After the removal of the polymer from the condenser, the pressure on the inlet to the reactor dropped to 12 p.s.i.g., and the production of crude styrene increased to about 2800 pounds per hour at approximately the same level of conversion of ethylbenzene to styrene as existed prior to removal of the polymer deposits.

We claim:
1. In a process for making styrene which comprises the catalytic dehydrogenation of ethylbenzene in the presence of superheated steam wherein a mixture of vapors is produced containing styrene, unreacted ethylbenzene and water, which mixture is condensed to the liquid state in a process vessel suitable therefor,
   the method of solubilizing polymeric deposits on the surface of said vessel which comprises contacting the polymer with a mixture of air and steam at a temperature of from about 180° to 270° C.
2. In a process for making styrene which comprises the catalytic dehydrogenation of ethylbenzene in the presence of superheated steam wherein a mixture of vapors is produced containing styrene, unreacted ethylbenzene and water, which mixture is condensed to the liquid state in a process vessel suitable therefor,
   the method of removing polymeric deposits from the surface of said vessel which comprises,
   (a) contacting the polymer with a mixture of air and steam at a temperature of from about 180° to 270° C., and
   (b) dissolving the residue resulting from (a) in styrene, said mixture of air and steam containing from about 1 to 50 cubic feet of air per pound of steam.

References Cited

UNITED STATES PATENTS 3,067,268   12/1962   Dunlop et al. _____ 260—669

DELBERT E. GANTZ, *Primary Examiner.*

CURTIS R. DAVIS, *Assistant Examiner.*

U.S. Cl. X.R.

260—93.5